US010226931B2

(12) United States Patent
Koshiba et al.

(10) Patent No.: US 10,226,931 B2
(45) Date of Patent: Mar. 12, 2019

(54) PRINTER

(71) Applicant: MIMAKI ENGINEERING CO., LTD., Nagano (JP)

(72) Inventors: Sho Koshiba, Nagano (JP); Katsutoshi Yamabe, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 15/888,095

(22) Filed: Feb. 5, 2018

(65) Prior Publication Data

US 2018/0229507 A1 Aug. 16, 2018

(30) Foreign Application Priority Data

Feb. 16, 2017 (JP) ................................. 2017-027314

(51) Int. Cl.
*B41J 2/17* (2006.01)
*B41J 2/045* (2006.01)
*B41J 15/04* (2006.01)
*G06K 15/02* (2006.01)
*G06K 15/10* (2006.01)
*B41J 2/01* (2006.01)
*B41J 3/407* (2006.01)
*B41J 11/06* (2006.01)

(52) U.S. Cl.
CPC ............... *B41J 2/1721* (2013.01); *B41J 2/01* (2013.01); *B41J 2/04508* (2013.01); *B41J 2/04586* (2013.01); *B41J 3/4078* (2013.01); *B41J 11/06* (2013.01); *B41J 15/04* (2013.01); *G06K 15/022* (2013.01); *G06K 15/102* (2013.01); *B41J 2002/1742* (2013.01)

(58) Field of Classification Search
CPC ...... B41J 2/01; B41J 2/04508; B41J 2/04586; B41J 2/1721; B41J 3/4078; B41J 11/06; B41J 15/04; B41J 2002/1742; G06K 15/022; G06K 15/102
See application file for complete search history.

(56) References Cited

U.S. PATENT DOCUMENTS

2008/0278537 A1* 11/2008 Watanabe ............ B41J 2/16538
347/32
2014/0132668 A1* 5/2014 Takeuchi ............ B41J 2/16579
347/33

FOREIGN PATENT DOCUMENTS

JP 2003096658 4/2003

* cited by examiner

*Primary Examiner* — Anh T. N. Vo
(74) *Attorney, Agent, or Firm* — JCIPRNET

(57) ABSTRACT

A printer includes a medium transporter configured to feed out a medium in a rolled shape and transport the medium in a first direction; a head provided movably in a second direction and configured to eject droplets for image-forming downward along a vertical direction toward the medium which is transported; a receiver provided below a region of the medium facing the head along the vertical direction, and configured to receive the droplets ejected onto the medium from the head and having passed through the medium downward along the vertical direction; and a support member configured switchably arranged at a supporting position arranged between the medium and the receiver along the vertical direction and a retracted position that is retracted from the supporting position, and configured capable of supporting the medium in a state of being arranged at the supporting position.

20 Claims, 14 Drawing Sheets

PRINTER

CROSS REFERENCE TO RELATED APPLICATIONS

This application claims the priority benefit of Japanese Patent Application No. 2017-027314, filed on Feb. 16, 2017. The entirety of the above-mentioned patent application is hereby incorporated by reference herein and made a part of this specification.

TECHNICAL FIELD

The present disclosure relates to a printer.

DESCRIPTION OF THE BACKGROUND ART

As a printer for printing on a medium such as a fabric or paper, for example an inkjet type printer that ejects droplets from a head onto the medium is known. The inkjet type printer includes a transporter for feeding out the rolled medium, and the head for ejecting the image-forming droplets toward a surface of the transported medium.

In such an inkjet type printer, for example, when the droplets are to be ejected onto a coarse medium such as a fabric, there is a case where a so-called fall-through, where the droplets having struck a front surface of the medium pass through the medium and fall from a back surface, may occur. Due to this, some inkjet type printers are provided with an ink receiver for receiving the droplets that have fallen through, without directly supporting the medium.

On the other hand, in a printer provided with an ink receiver, when a medium touches droplets received in the ink receiver, the medium is thereby contaminated. For example, when the medium on which printing is completed is to be cut, there is a possibility that a cut piece immediately after the cutting may fall into the receiver, upon which the droplets in the receiver may adhere to the cut piece. In order to prevent such a situation from occurring, a configuration that provides a guide or a cover for providing support to prevent the medium from falling in the receiver is known (for example, see Japanese Unexamined Patent Publication No. 2003-96658).

Patent literature 1: Japanese Unexamined Patent Publication No. 2003-96658

SUMMARY

The guide or the cover described in Japanese Unexamined Patent Publication No. 2003-96658 remains in a state of being arranged in the receiver even in a case where droplets are ejected out from a head onto the medium. Due to this, the droplets that have fallen through the medium may adhere to the guide or the cover. When the droplets adhere to the guide or the cover, the droplets may adhere to the medium when the guide or the cover supports the medium, and the medium may thereby be contaminated.

The present disclosure is made in view of the foregoing, and aims to provide a printer that can inhibit a medium from being contaminated by droplets.

A printer according to the present disclosure includes a medium transporter configured to feed out a medium in a rolled shape and transport the medium in a first direction; a head provided movably in a second direction intersecting the first direction and configured to eject droplets for image-forming downward along a vertical direction toward the medium which is transported; a receiver provided below a region of the medium facing the head along the vertical direction, and configured to receive the droplets which are ejected onto the medium from the head and pass through the medium downward along the vertical direction; and a support member configured switchably arranged at a supporting position arranged between the medium and the receiver along the vertical direction and a retracted position that is retracted from the supporting position, and configured capable of supporting the medium in a state of being arranged at the supporting position.

According to the present disclosure, when the support member is arranged at the supporting position, it can support the medium upon cutting the medium. Due to this, the medium can be inhibited from contacting the receiver. Further, since the support member can be retracted to the retracted position, for example, when the droplets are ejected from the head, the support member can be shifted to a state of not covering the receiver. In this case, the droplets having passed through the medium can be inhibited from adhering to the support member, and thus the droplets can be inhibited from adhering to the medium when the medium is supported by the support member. Due to this, the medium can be inhibited from being contaminated by the droplets.

Further, in the above printer, the receiver may include a recess at a portion facing the medium, and the supporting position may be a position above the recess along the vertical direction, and may be a position where the support member covers an entirety of the recess in the first direction.

According to the present disclosure, since the support member is arranged at the position above the recess provided on the receiver along the vertical direction, which also is the position where the support member covers the entirety of the recess in the first direction, the medium can more surely be inhibited from entering into the recess.

Further, in the above printer, the support member may be formed by using at least one of a flexible sheet material and a flexible linear material.

According to the present disclosure, the support member can be loosened or stretched, and as such, it can be in a stretched state under a state of being arranged at the supporting position, and be in a loosened state under a state of being arranged at the retracted position, for example. Due to this, the support member can stand by in a desired state.

Further, the support member may be movable along the first direction between the supporting position and the retracted position.

According to the present disclosure, since the support member moves along the first direction between the supporting position and the retracted position, switching between the supporting position and the retracted position can be performed within a short period of time.

Further, the support member may be arranged in plurality with an interval in between them along the second direction, and the plurality of support members may be integrally movable between the supporting position and the retracted position.

According to the present disclosure, since the plurality of support members arranged with the interval in between them along the second direction can move integrally along the first direction, the switching in the arrangements of the support members can surely be performed while reducing an amount of usage of the support members.

Further, the support member may be movable along the second direction between the supporting position and the retracted position.

According to the present disclosure, spaces on sides along the first direction, which is a transporting direction of the medium, can be used efficiently by enabling the movement in the second direction.

Further, the printer may further include a detector capable of detecting a state in which the support member is arranged at the supporting position.

According to the present disclosure, a detection result obtained by detecting the state in which the support member is arranged at the supporting position can be used as a trigger for work or operations related to printing or the like of the medium. For example, the medium may be cut when the state in which the support member is arranged at the supporting position is confirmed. Due to this, the medium can more surely be inhibited from contacting the receiver.

Further, the printer may further include a controller configured to cause the head to halt an ejecting operation of the droplets when the state in which the support member is arranged at the supporting position is detected by the detector.

According to the present disclosure, since the ejecting operation of the droplets is halted when the state in which the support member is arranged at the supporting position is detected, the droplets can be inhibited from adhering to the support member.

Further, the controller may restart the ejecting operation when the state in which the support member is arranged at the supporting position is no longer detected.

According to the present disclosure, since the ejecting operation is automatically restarted when the support member retracts from the supporting position, efficient printing can be performed.

According to the present disclosure, the droplets can be inhibited from adhering to the support member.

DETAILED DESCRIPTION OF EMBODIMENTS

Hereinbelow, embodiments of a printer according to the present disclosure will be described with reference to the drawings. It should be noted that the present disclosure is not limited by these embodiments. Further, constituent features of the below embodiments include those which a person skilled in the art can replace, or those that are substantially same.

First Embodiment

Figure 1:
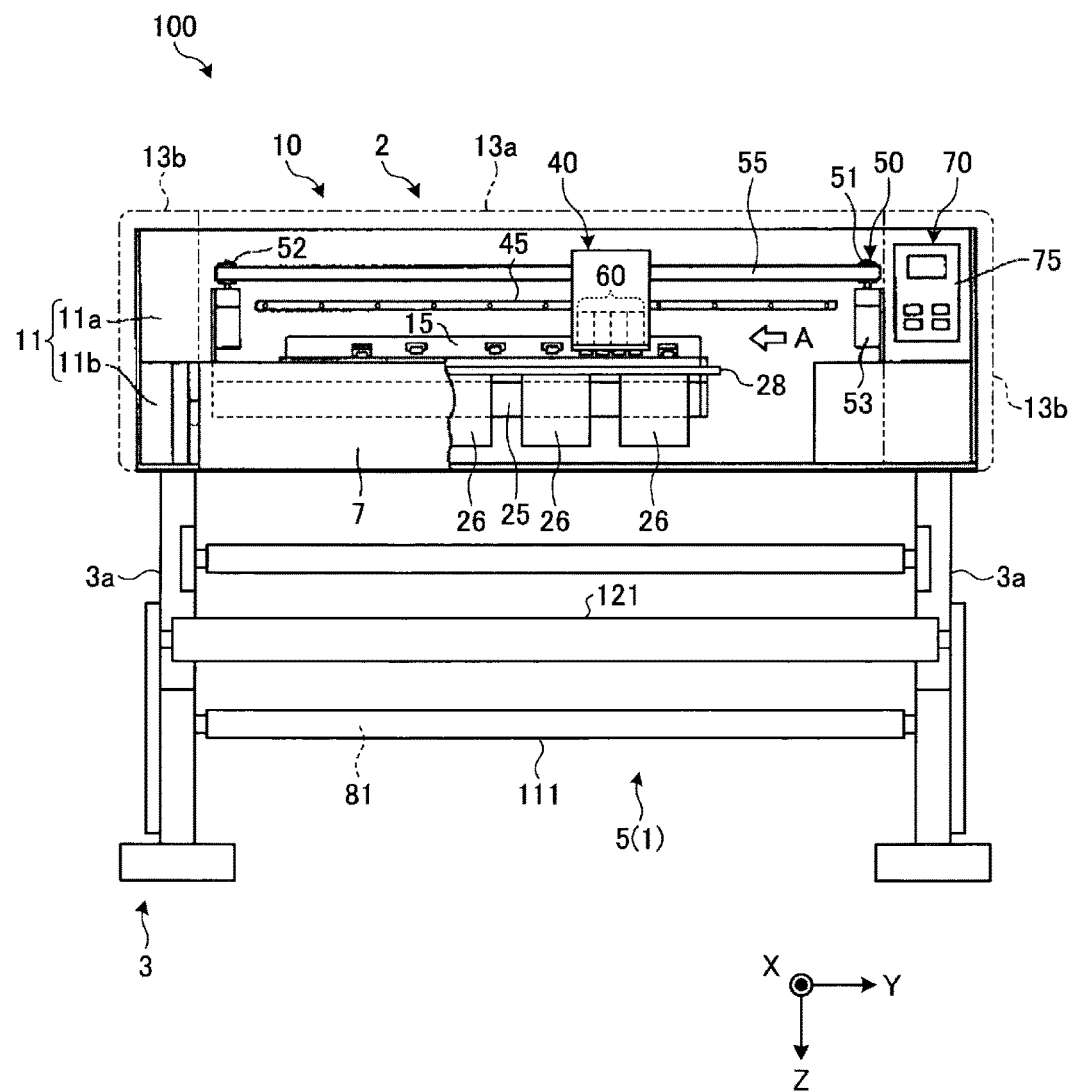
FIG. 1 is a diagram illustrating an example of a printer according to a first embodiment.
Figure 2:
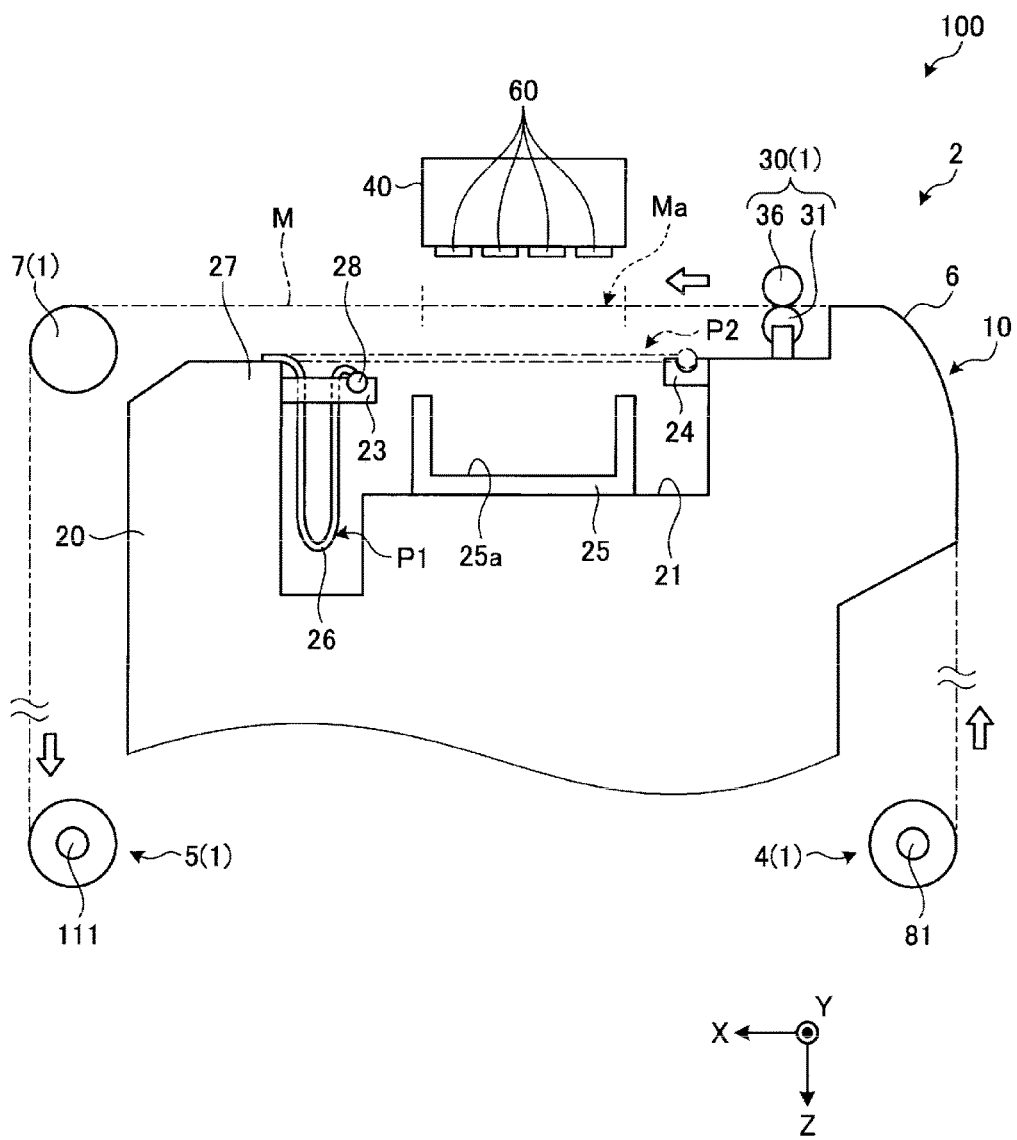
FIG. 2 is a diagram illustrating a configuration seen along a direction of an arrow A in FIG. 1.

FIG. 1 is a diagram illustrating an example of a printer according to a first embodiment. FIG. 2 is a diagram illustrating a configuration seen along a direction of an arrow A in FIG. 1. In the below description, explanation will proceed with an up and down direction along a vertical direction, being an up and down direction in a normal state of use of a printer 100 as a Z direction, a direction (second direction) along which a carriage 40 to be described later moves during printing using the printer 100 as a Y direction, and a direction (first direction) which intersects orthogonally to both the Y and Z directions as an X direction. The printer 100 is an apparatus that performs print processing of letters and figures by ejecting liquid such as ink onto a recording surface (printing surface) of a sheet-like medium M, such as a fabric or a resin sheet (for example, made of vinyl chloride, polyester, and the like).

The printer 100 includes a main body 2 formed in a laterally-elongated rectangular box shape, and a support 3 for supporting the main body 2 at a height position which facilitates work thereon. The support 3 includes legs 3a on both sides along the Y direction, and the printer 100 is set at a desired position by these legs 3a being in contact with a floor. Further, a medium feeding mechanism 4 for feeding out an unprocessed medium M wound up in a roll, that is, the medium M before printing process, to the main body 2, and a medium winding mechanism 5 for winding up the medium M on which printing is finished are provided on both sides of the support 3 along the X direction. The medium feeding mechanism 4 and the medium winding mechanism 5 configure a part of a medium transporter 1 configured to transport the medium M.

The main body 2 includes a body 10, a medium support 20, a medium transporting mechanism 30, a carriage 40, a carriage moving mechanism 50, recording heads 60, and a control unit 70. The body 10 is provided as an attachment base for respective mechanisms. The body 10 includes a body frame 11. The body frame 11 includes an upper frame 11a and a lower frame 11b. The medium support 20, the medium transporting mechanism 30, and the like are provided on the lower frame 11b. A roller assembly of the medium transporting mechanism 30, a support structure of the carriage 40, and the like are provided on the upper frame 11a. A medium inserting portion 15 where the medium M passes is formed between the upper frame 11a and the lower frame 11b. The body 10 is surrounded by a front cover 13a covering a center portion of the body frame 11 and side covers 13b covering left and right sides of the body frame 11, and is configured in a laterally-elongated rectangular box shape as a whole.

The medium support 20 is provided at a position on an upstream side of the medium transporting mechanism 30 in a transport path of the medium M. The medium support 20 supports the medium M from below, and sends out the medium M, which is fed thereto from a medium feeding mechanism 4 side, toward the medium transporting mechanism 30 by making the medium M be in a horizontal state. The medium support 20 is provided with a medium supporting surface 6 being a smooth curved surface. The medium supporting surface 6 may be provided with a mechanism for suck-retaining the medium M.

The medium transporting mechanism 30 moves the medium M from the medium feeding mechanism 4 side to the medium winding mechanism 5. The medium transporting mechanism 30 configures a part of the medium transporter 1. The medium transporting mechanism 30 includes a feed roller 31 and pinch rollers 36. The feed roller 31 is provided rotatably about a rotary axis extending in the Y direction. The pinch rollers 36 are positioned above the feed roller 31, and are elastically in contact with the feed roller 31. The pinch rollers 36 are arranged in plurality by being aligned along the Y direction. The medium transporting mechanism 30 transports the medium M by a feed amount according to a rotation angle of the feed roller 31 by rotating the feed roller 31 in a state where the medium M is held from above and below by the feed roller 31 and the pinch rollers 36. The medium transporting mechanism 30 transports the medium M to a downstream side along the transporting direction by the feed amount according to a drive control value by the feed roller 31 rotating on the basis of a control signal outputted from the control unit 70. The medium transporting mechanism 30 is provided for example with a servo motor (not illustrated) and the like as a drive source for driving the feed roller 31.

The carriage 40 is arranged above the transport path of the medium M, and is supported to be freely movable in the Y direction (main scanning direction, second direction) along a guide rail 45. The carriage moving mechanism 50 reciprocates the carriage 40 along the Y direction. The carriage moving mechanism 50 includes a driving pulley 51 and a driven pulley 52, a servo motor 53, and a timing belt 55. The servo motor 53 rotates, as a result of which its rotation is transmitted to the carriage 40 through the timing belt 55, and the carriage 40 thereby moves along the Y direction. The rotation of the servo motor 53 is controlled by the control unit 70.

The recording heads 60 are retained by the carriage 40 in plurality. The recording heads 60 are arranged at positions by which a certain gap is provided from the medium M along the Z direction. The recording heads 60 are retained by the carriage 40 in plurality, and are provided facing the medium M. The recording heads 60 eject image-forming ink (droplets) onto the medium M from their nozzles that are not illustrated. As the recording heads 60, for example, a configuration having plural nozzle rows having such nozzles aligned along the X direction may be exemplified. Further, for example, four recording heads 60 are provided along both the X and Y directions. It should be noted that a configuration, a number, an arrangement, and the like of the recording heads 60 are not limited to the above, and they may have other configuration, number, and arrangement.

The control unit 70 is provided as a controller configured to control operations of respective sections of the printer 100, such as movement of the medium M along the X direction by the medium transporting mechanism 30, movement of the carriage 40 along the Y direction by the carriage moving mechanism 50, ink ejection from the respective nozzles of the recording heads 60, feeding operation of the medium M by the medium feeding mechanism 4 and winding operation of the medium M by the medium winding mechanism 5 to be described later, and the like. The control unit 70 performs the printing process of letters and figures according to a processing program on the medium M by relatively moving the medium M and the recording heads 60 by combining the movement of the medium M along the X direction by the medium transporting mechanism 30 and the movement of the carriage 40 along the Y direction by the carriage moving mechanism 50, and causing the respective nozzles of the recording heads 60 to eject the ink onto the medium M.

The control unit 70 is arranged in a vicinity of an upper portion of a position on one end side of the body 10 along the Y direction. This control unit 70 is provided with an operation panel 75 for performing input operations and the like to the control unit 70, which includes a liquid crystal display for displaying various types of information, and various types of operating buttons, such as function keys for selecting a function to be set, a jog key for selecting an execution content, an enter key for entering a selected content, a clear key for deleting settings, and the like. Due to this, an operator can set printing conditions while confirming displayed contents of the liquid crystal display to perform the printing process.

A tension roller 7 is provided on the downstream side of the carriage 40 in the transporting direction of the medium M. The tension roller 7 configures a part of the medium transporter 1. The tension roller 7 applies constant tension force on the medium M along a feed direction. The tension roller 7 is provided rotatably about a rotary axis extending along the Y direction. The tension roller 7 is arranged such that its end position along the Z direction becomes substantially same as that of the feed roller 31.

In the medium support 20, a recess 21 is formed below the carriage 40. The recess 21 has an ink receiver 25 arranged therein. The ink receiver 25 is arranged below a facing region Ma of the medium M, which faces the recording heads 60 in the Z direction. The ink receiver 25 receives the ink having been ejected from the recording heads 60 onto the medium M and having passed through the medium M downward. The ink receiver 25 includes a recess 25a for storing the ink. The recess 25a is formed in a groove shape extending along the Y direction, for example. The ink receiver 25 is arranged to be positioned lower than upper end portions of the tension roller 7 and the feed roller 31 along the Z direction, for example, so that the medium M does not touch it. It should be noted that the ink receiver 25 may be configured by arranging a container within the recess 21, or a groove-shaped recess may be formed in the medium support 20 to use this recess as the ink receiver 25.

Support members 26 are arranged on the downstream side relative to the ink receiver 25 in the transporting direction of the medium M. The support members 26 are arranged on the downstream side relative to the ink receiver 25 in the transporting direction of the medium M. The support members 26 are configured capable of being switched to be arranged between a supporting position P2, being a position between the medium M and the ink receiver 25 along the Z direction, and a retracted position P1, being retracted from the supporting position P2.

Figure 3:
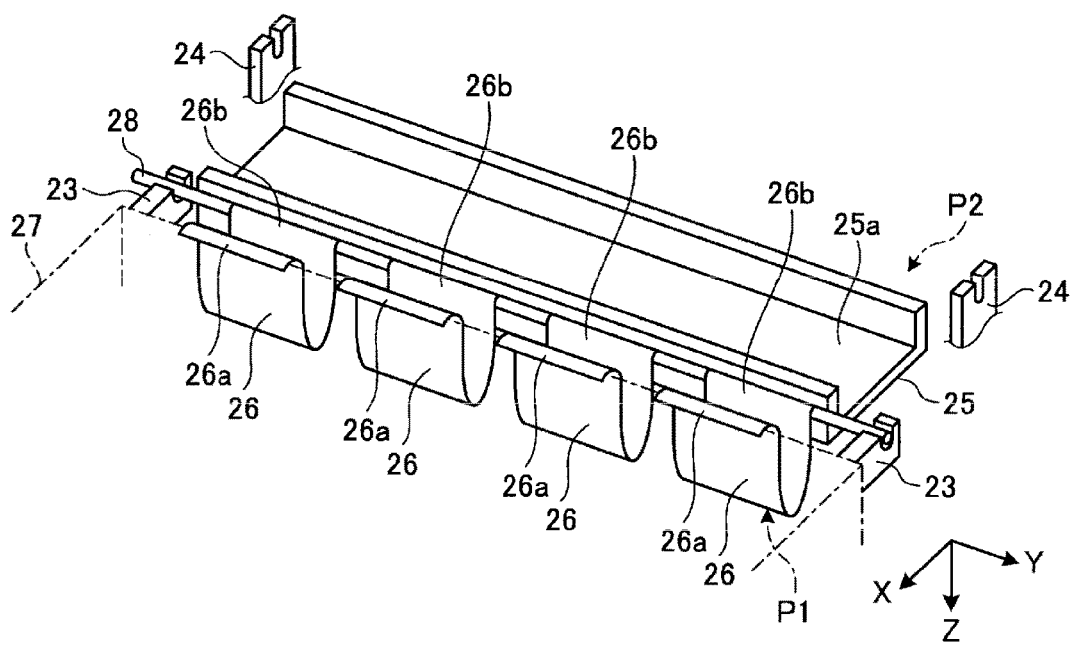
FIG. 3 is a diagram illustrating a configuration of a part of the printer according to the present embodiment.
Figure 4:
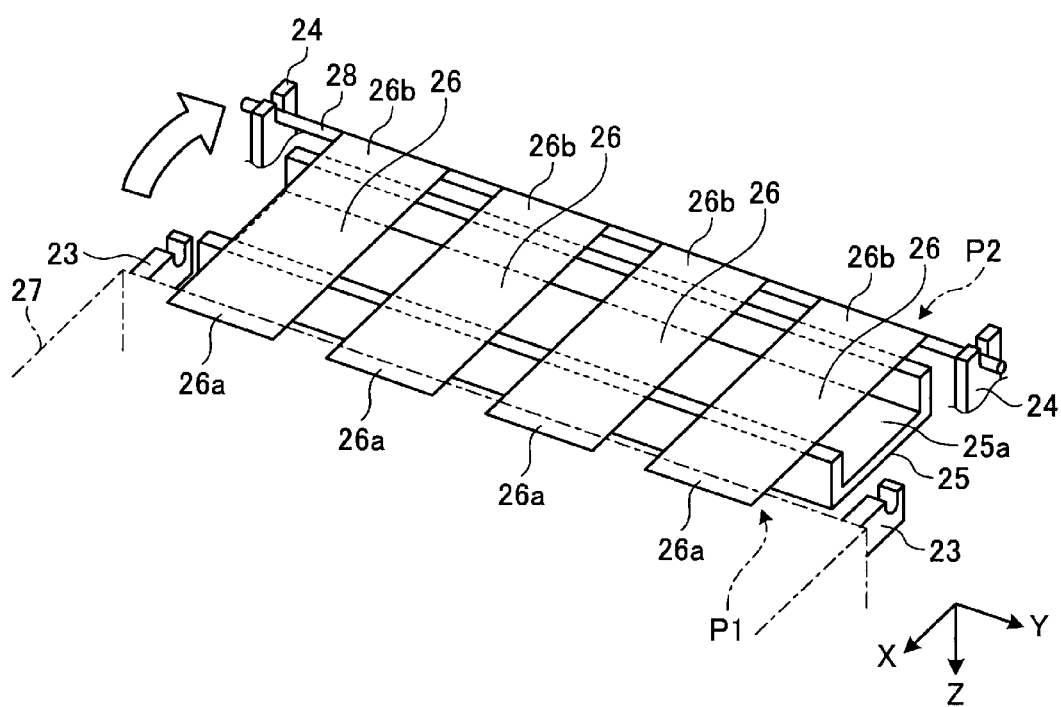
FIG. 4 is a diagram illustrating the configuration of a part of the printer according to the present embodiment.

FIGS. 3 and 4 are perspective diagrams illustrating an example of the ink receiver 25 and the support members 26. FIG. 3 is a diagram of a state in which the support members 26 are arranged at the retracted position P1. FIG. 4 is a diagram of a state in which the support members 26 are arranged at the supporting position P2. As illustrated in FIGS. 3 and 4, the support members 26 are formed by using flexible sheet members. The support members 26 are formed in a ribbon shape, and a plurality thereof (four in FIGS. 3 and 4) are arranged along the Y direction with a certain interval in between them.

Each support member 26 has one end 26a fixed to a fixing portion 27. The fixing portion 27 is arranged within the medium support 20, on the downstream side in the transporting direction of the medium M relative to the ink receiver 25. Each support member 26 has the other end 26b connected to a coupling member 28. The coupling member 28 is formed in a bar shape, and is arranged to extend along the Y direction. The other ends 26b of the respective support members 26 are coupled to the coupling member 28.

The coupling member 28 can be supported respectively by retracted-side retaining portions 23 and supporting-side retaining portions 24. The retracted-side retaining portions 23 and the supporting-side retaining portions 24 respectively support both ends of the coupling member 28 along the Y direction. The retracted-side retaining portions 23 are arranged for example between the fixing portion 27 and the ink receiver 25. The supporting-side retaining portions 24 are arranged for example on an upstream side of the ink receiver 25 along the transporting direction of the medium M. The arrangements of the retracted-side retaining portions 23 and the supporting-side retaining portions 24 are not limited to the above, and other arrangements may be employed.

As illustrated in FIG. 3, when the coupling member 28 is retained by the retracted-side retaining portions 23, each of the support members 26 is arranged at a retracted position P1. Each support members 26 is arranged at the retracted position P1 in a state where its portion between the end 26a and the end 26b sags downward along the vertical direction. When the support members 26 are arranged at the retracted position P1, they are not arranged above the ink receiver 25 along the Z direction, and instead are arranged away from the ink receiver 25 along the X direction so that the ink ejected from the recording heads 60 does not adhere thereon.

As illustrated in FIG. 4, when the coupling member 28 is retained by the supporting-side retaining portions 24, each of the support members 26 is arranged at a supporting position P2. Each of the support members 26 is arranged at the supporting position P2 in a state of being stretched along the X direction, for example, and covers at least a part of the ink receiver 25 where the ink receiver faces the medium M. In the present embodiment, the support members 26 come to be in a state of being extended along the X direction over the recess 25a of the ink receiver 25, above the recess 25a of the ink receiver 25 in the Z direction at the supporting position P2. For example, the supporting position P2 is set as a position covering an entirety of the recess 25a along the X direction. When the support members 26 are arranged at the supporting position P2, they can support the medium M while maintaining their state of extending in the X direction without being sagged or cut by weight of the medium M. The medium M is supported by the support members 26, by which it is inhibited from falling into the ink receiver 25.

Next, an operation of the printer 100 configured as above will be described. Firstly, before performing the operation of the printer 100, the medium M is set. For example, the medium M wound up in a roll is attached to a supply roller 81 by manual work by a worker. Next, an end of the roll of the medium M is drawn out, and is arranged on a transport path of the medium M, after which it is wound onto a winding roller 111. Specifically, the end of the medium M is drawn out on the medium supporting surface 6, and is made to pass through between the feed roller 31 and the pinch rollers 36 of the medium transporting mechanism 30. Further, the end is made to pass through between the recording heads 60 and the ink receiver 25, and is wound onto the tension roller 7 and a tensile force applying section 121, after which it is wound on the winding roller 111. In this way, setting of the medium M is completed.

After coming into a state where the medium M can be transported, the printer 100 controls respective sections by the control unit 70 when an operation starting instruction is inputted to the control unit 70. The printer 100 transports the medium M from the medium feeding mechanism 4 to the medium winding mechanism 5 via the medium transporting mechanism 30 and the tension roller 7 by the control unit 70. At this occasion, the medium M passing through between the recording heads 60 and the ink receiver 25 is in a state of being applied tensile force by the tension roller 7 and the tensile force applying section 121.

Further, the printer 100 ejects ink from the recording heads 60 onto the medium M while reciprocating the carriage 40 along the Y direction by the control unit 70. In this case, the recording heads 60 eject the ink with colors corresponding to an image to be formed on the medium M. The ejected ink adheres to an upper surface of the medium M in the Z direction. The image is formed on the upper surface of the medium M in the Z direction by the ink.

When the medium M is of a coarse material such as fabric, a part of the ink ejected from the recording heads 60 may not stay on the upper surface of the medium M in the Z direction, and a so-called fall-through may occur, where the ink passes through the medium M downward in the Z direction. The ink that has fallen through the medium M is received by the ink receiver 25 arranged below the recording heads 60 and stored therein. Since the support members 26 are arranged at the retracted position P1 and not covering the ink receiver 25, the fallen-through ink is collected in the recess 25a of the ink receiver 25 without adhering to the support members 26.

When the formation of the image on the medium M is completed, operations of the carriage 40 and the recording heads 60 are stopped by the control unit 70. Further, transportation of the medium M is stopped by the control unit 70.

After the carriage 40 and the recording heads 60 have stopped and the transportation of the medium M is stopped, for example, a part of the medium M is cut to collect a portion where the image is formed by manual work of the worker and the like. At this occasion, the coupling member 28 coupling the support members 26 are moved from the retracted-side retaining portions 23 to the supporting-side retaining portions 24. This work is performed for example by manual work of the worker. With the coupling member 28 being arranged at the supporting-side retaining portions 24, the support members 26 come to be arranged at the supporting position P2. That is, a part of the recess 25a of the ink receiver 25 comes to be in the state of being covered by the support members 26. The cut piece of the medium M, of which tensile force has been lost due to the cutting, is supported by the support members 26. Due to this, the cut piece of the medium M can be inhibited from falling into the recess 25a of the ink receiver 25.

It should be noted that, a cut piece of the medium M on which no image has been formed is wound onto the winding roller 111 after having been orderly arranged on the transport path of the medium M by the manual work of the worker. After this, the printer 100 controls the respective sections by the control unit 70 to operate them when the operation starting instruction input from outside is made, and printing operation is thereby performed.

At this occasion, if a subsequent printing operation is performed in the state where the support members 26 are arranged at the supporting position P2, there is a possibility that the ink which has fallen through the medium M adheres to the support members 26. Thus, the worker moves the coupling member 28 from the supporting-side retaining portions 24 to the retracted-side retaining portions 23 before performing the printing operation. By arranging the coupling member 28 at the retracted-side retaining portions 23, the support members 26 come to be arranged at the retracted position P1. That is, the ink receiver 25 comes to be in an uncovered state. Due to this, the ink that has fallen through the medium M does not adhere to the support members 26 and is collected in the recess 25a of the ink receiver 25.

As above, since the printer 100 according to the present embodiment can cover at least a part of a portion of the ink receiver 25 facing the medium M using the support members 26, the medium M can be inhibited from touching the ink receiver 25 upon cutting or the like of the medium M. Further, since the support members 26 can be retracted to the retracted position P1, the state in which the support members 26 do not cover the ink receiver 25 can be realized for example when the ink is to be ejected from the recording heads 60. Due to this, the ink that has fallen through the medium M can be inhibited from adhering to the support members 26. In this way, since the ink does not adhere even when the medium M is supported by the support members 26, the medium M can be inhibited from being contaminated with ink.

Second Embodiment

Figure 5:
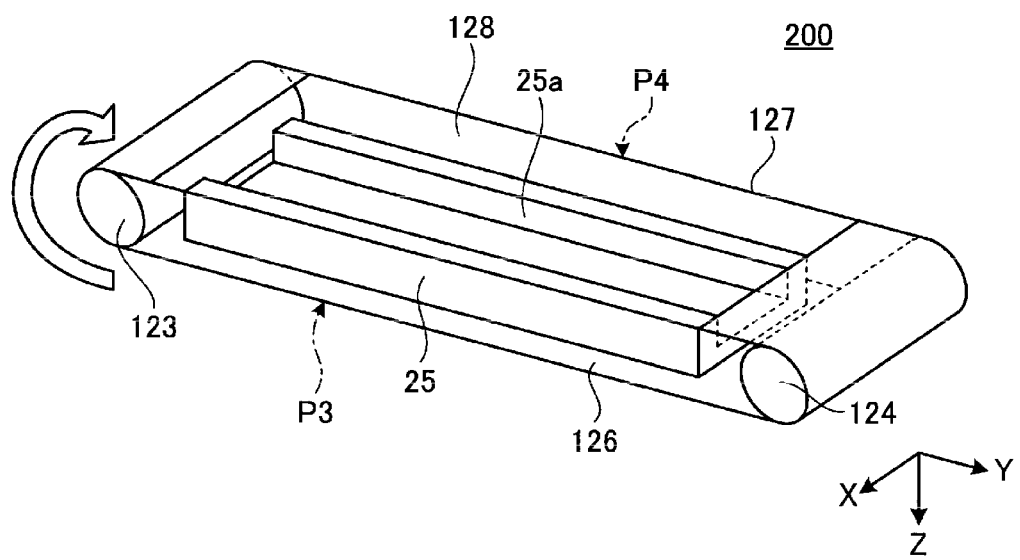
FIG. 5 is a diagram illustrating a configuration of a part of a printer according to a second embodiment.
Figure 6:
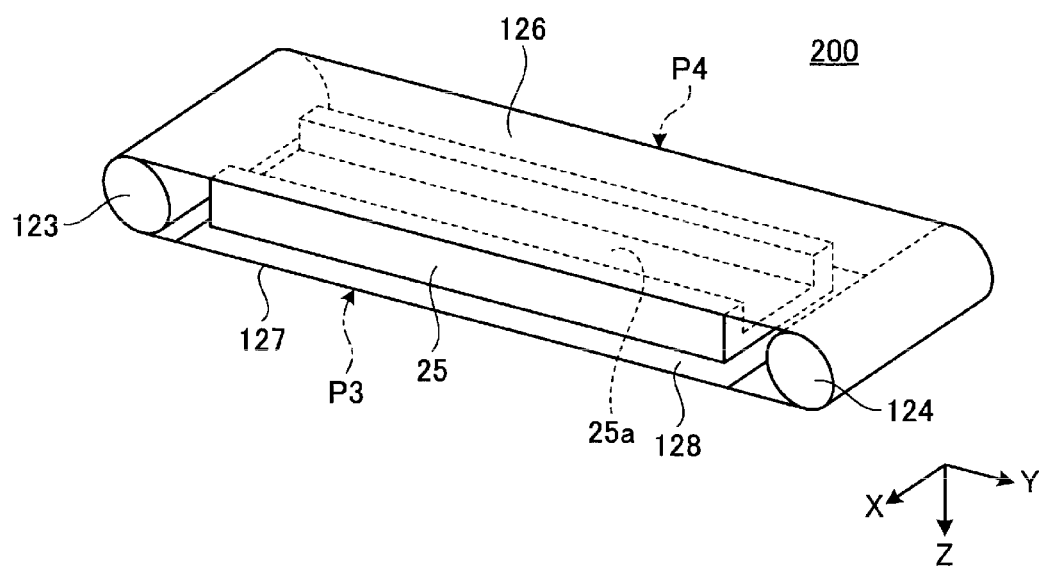
FIG. 6 is a diagram illustrating the configuration of a part of the printer according to the present embodiment.

FIGS. 5 and 6 are perspective diagrams illustrating a part of a configuration of a printer according to a second embodiment. A printer 200 according to the second embodiment differs from the first embodiment regarding a configuration of a support member 126, and thus this difference will mainly be described. It should be noted that other configurations of the printer 200 may be configured same as the respective configurations of the printer 100 described in the first embodiment.

As illustrated in FIGS. 5 and 6, the support member 126 is forming for example in a rectangular shape, and is formed with a dimension with which at least an upper portion of the ink receiver 25 in the Z direction can be covered. For example, the support member 126 has a dimension in the X direction larger than a dimension of the ink receiver 25 in the X direction, and a dimension in the Y direction larger than a dimension of the ink receiver 25 in the Y direction. The support member 126 is arranged so that its longitudinal direction is parallel to the Y direction.

The support member 126 is formed in a loop by two wire members 127. The wire members 127 couple corners at both ends of the support member 126 in the longitudinal direction. The two wire members 127 are formed with a length that is the same as each other. A portion surrounded by both end edges of the support member 126 in the longitudinal direction and the two wire members 127 is formed as an opening 128. The two wire members 127 are formed with a dimension by which the opening 128 can expose an entirety of the ink receiver 25. For example, the two wire members 127 have a dimension in the Y direction larger than the dimension of the ink receiver 25 in the Y direction.

The support member 126 is strapped across a driving roller 123 and a driven roller 124, for example. The driving roller 123 and the driven roller 124 are provided at both sides of the ink receiver 25 in the Y direction, and are arranged parallel to the X direction. The driving roller 123 and the driven roller 124 are rotatable about axial lines of their rotary axes parallel to the X direction. An operation of the driving roller 123 is controlled for example by the control unit 70. By actuating the driving roller 123, the support member 126 is enabled to move primarily in the Y direction between a retracted position P3 and a supporting position P4.

When the support member 126 is arranged at the retracted position P3, for example as illustrated in FIG. 5, the opening 128 is arranged above the ink receiver 25 in the Z direction, and the support member 126 is arranged below the ink receiver 25 in the Z direction. In this case, the ink receiver 25 is in a state of not being covered by the support member 126.

When the support member 126 is arranged at the supporting position P4, for example as illustrated in FIG. 6, the support member 126 is arranged above the ink receiver 25 in the Z direction, and the opening 128 is arranged below the ink receiver 25 in the Z direction. In this case, the ink receiver 25 is in a state of being covered by the support member 126.

As above, since the printer 200 according to the second embodiment is capable of arranging the support member 126 switchably between the retracted position P3 and the supporting position P4, the medium M can be supported for example upon cutting the medium M. Further, when the ink is to be ejected from the recording heads 60, it can be brought to the state of not covering the ink receiver 25. Due to this, the ink that has fallen through the medium M can be inhibited from adhering to the support member 126, and the medium M can be inhibited from being contaminated with the ink. Further, the printer 200 can efficiently use spaces on both sides of the ink receiver 25 in the Y direction by enabling the support member 126 to move in the Y direction.

Figure 7:
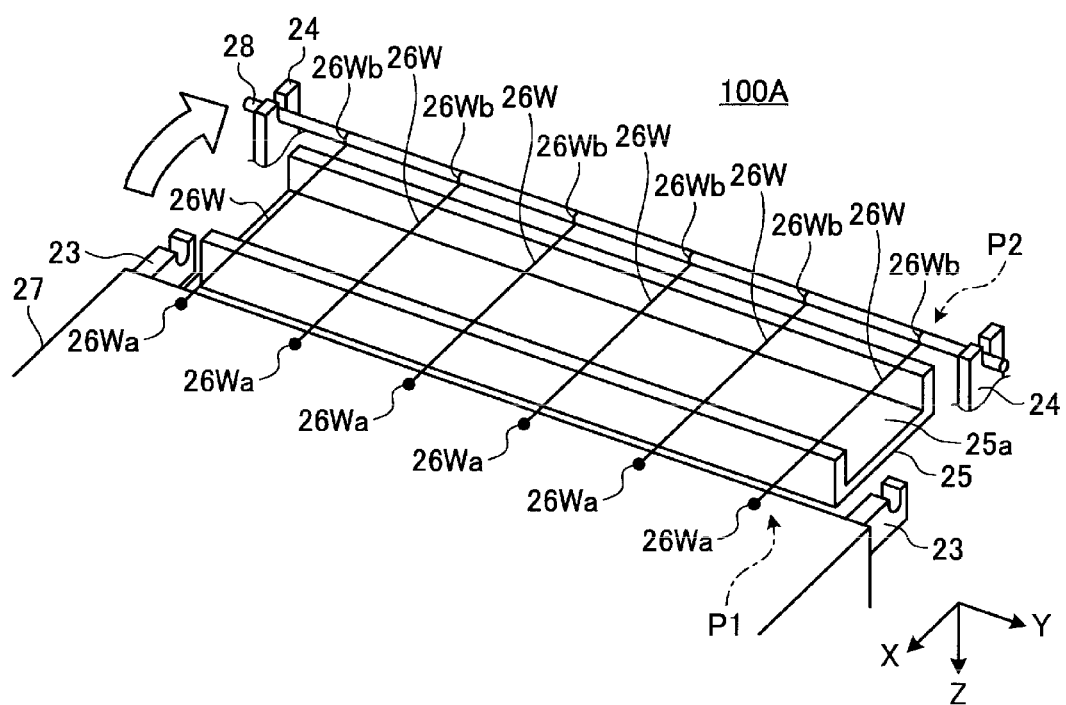
FIG. 7 is a diagram illustrating a configuration of a part of a printer according to a modified example.

The technical scope of the present disclosure is not limited by the above embodiments, and suitable modifications may be made within the scope that does not go beyond the essence of the present disclosure. For example, in the first embodiment as above, the configuration in which the support members 26 are formed by sheet materials was exemplified; however, no limitation is made hereto. FIG. 7 is a perspective diagram illustrating an example of a printer 100A according to a modified example. As illustrated in FIG. 7, support members 26W made of linear materials may be used instead of the support members 26 made of the sheet materials. The support members 26W have their ends 26Wa fixed to the fixing portion 27, and the other ends 26Wb coupled to the coupling member 28.

In this configuration, in a case where the coupling member 28 is retained by the retracted-side retaining portions 23, the support members 26W are arranged at the retracted position P1. The support members 26W are not arranged above the ink receiver 25 in the Z direction, and are arranged apart in the X direction from the ink receiver 25 so that the ink ejected from the recording heads 60 does not adhere thereon.

Further, when the coupling member 28 is retained by the supporting-side retaining portions 24, the respective support members 26W are arranged at the supporting position P2. The support members 26W are arranged in the state of extending in the X direction for example at the supporting position P2, and are in a state of being extended in the X direction over the recess 25a of the ink receiver 25, above the recess 25a of the ink receiver 25 in the Z direction. When the support members 26W are arranged at the supporting position P2, they can support the medium M while maintaining their state of extending in the X direction without being sagged or cut by weight of the medium M. The medium M is supported by the support members 26W, by which it is inhibited from falling into the ink receiver 25. Further, since the support members 26W are light-weight as compared to the case of using the sheet materials, load upon switching the position between the retracted position P1 and the supporting position P2 can be reduced.

Figure 8:
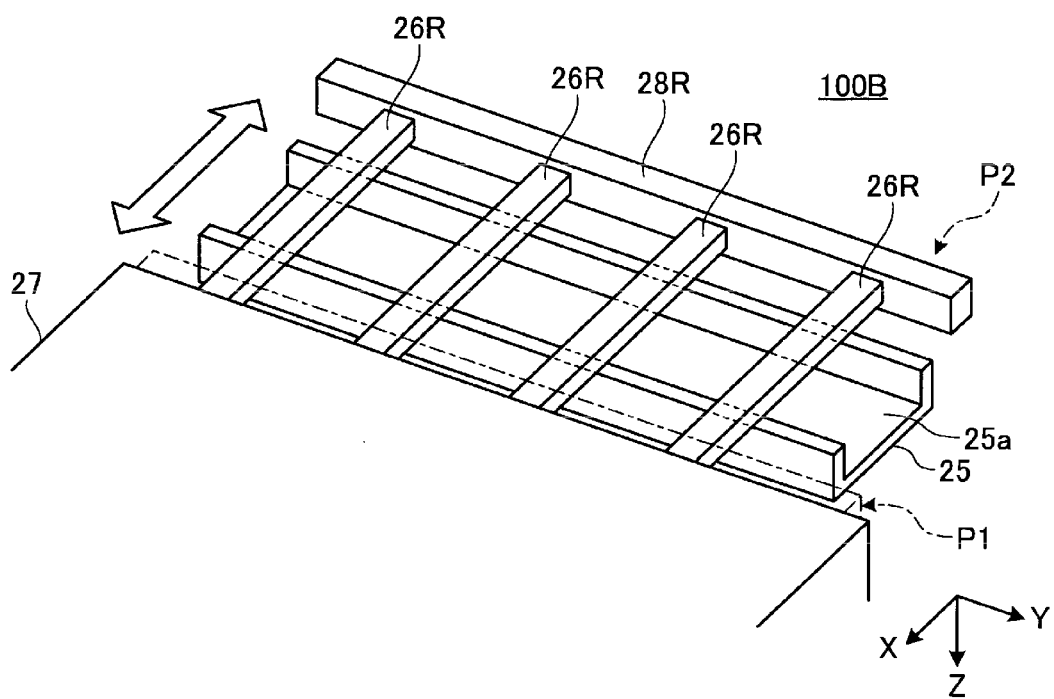
FIG. 8 is a diagram illustrating a configuration of a part of a printer according to a modified example.

Further, FIG. 8 is a perspective diagram illustrating an example of a printer 100B according to a modified example. As illustrated in FIG. 8, solid support members 26R may be used instead of the support members 26 made of the sheet materials. The support members 26R are provided in plurality along the Y direction, and are configured slidably movable in the X direction with respect to a wall of the fixing portion 27, for example. That is, the support members 26R can be arranged above the ink receiver 25 by drawing them out by sliding toward an upstream side of the transporting direction of the medium M from their state of being housed in the wall of the fixing portion 27. Further, the support members 26R are configured capable of being housed in the wall of the fixing portion 27 by sliding them toward a downstream side in the transporting direction of the medium M from their state of being arranged above the ink receiver 25. Each of the support members 26R is coupled by a coupling member 28R. Accordingly, each support member 26R can be slid in the X direction integrally with the coupling member 28R.

In this configuration, when the support members 26R are to be housed in the fixing portion 27, the support members 26R are arranged at the retracted position P1. Further, when the support members 26R are drawn out over the ink receiver 25, the respective support members 26R are arranged at the supporting position P2. At the supporting position P2, the support members 26R can support the medium M while maintaining their state of extending in the X direction without being sagged or broken by weight of the medium M.

Figure 9:
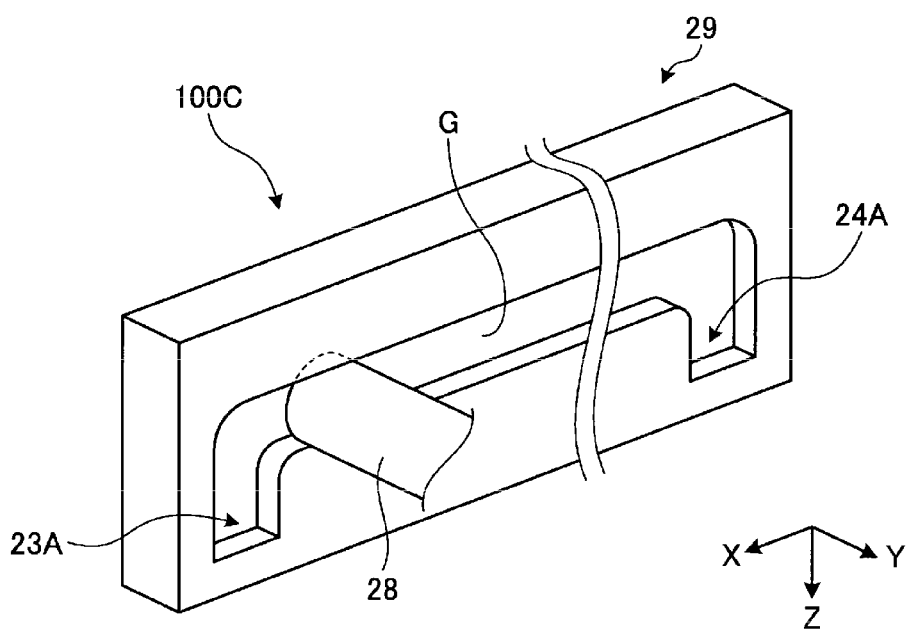
FIG. 9 is a diagram illustrating a configuration of a part of a printer according to a modified example.

Further, in the configuration of the printer 100 according to the first embodiment as above, a guiding mechanism for guiding the coupling member 28 may be provided. FIG. 9 is a diagram illustrating a part of a configuration of a printer 100C according to a modified example. As illustrated in FIG. 9, the printer 100C includes a guiding mechanism 29 for guiding the coupling member 28. The guiding mechanism 29 includes a retracted-side retaining portion 23A, a supporting-side retaining portion 24A, and a guide groove G. The retracted-side retaining portion 23A and the supporting-side retaining portion 24A are provided at positions matching each of the retracted-side retaining portion 23 and the supporting-side retaining portion 24 in the aforementioned embodiment. The guide groove G is a groove that couples the retracted-side retaining portion 23A and the supporting-side retaining portion 24A. The guide groove G is formed with a dimension by which the end of the coupling member 28 can be housed therein. It should be noted that FIG. 9 exemplifies a configuration in which the guiding mechanism 29 is provided at one end of the coupling member 28; however, no limitation is made hereto, and guiding mechanisms 29 may be provided at both ends of the coupling member 28. The coupling member 28 can be moved along the guide groove G by the guiding mechanism 29 to arrange the coupling member 28 in the retracted-side retaining portion 23A and in the supporting-side retaining portion 24A. Due to this, changes in the arrangement of the coupling member 28 can be performed smoothly within a short period of time.

Further, in the printer 100 according to the first embodiment, the case where the worker moves the coupling member 28 between the retracted-side retaining portions 23 and the supporting-side retaining portions 24 directly by manual work has been exemplified; however, no limitation is made hereto. For example, the coupling member 28 may be configured to move by switching between the retracted-side retaining portions 23 and the supporting-side retaining portions 24 using a lever. In this case, a link mechanism for moving the coupling member 28 by switching a moving destination thereof between the retracted-side retaining portions 23 and the supporting-side retaining portions 24 according to the movement of the lever is provided. Due to this, burden on the worker can be reduced. It should be noted that instead of the lever and the link mechanism, an electric actuator for actuating the coupling member 28 may be provided. In this case, for example, the worker may operate the control unit 70 to automatically switch the position of the coupling member 28. In this way, burden on the worker can be reduced.

Figure 10:
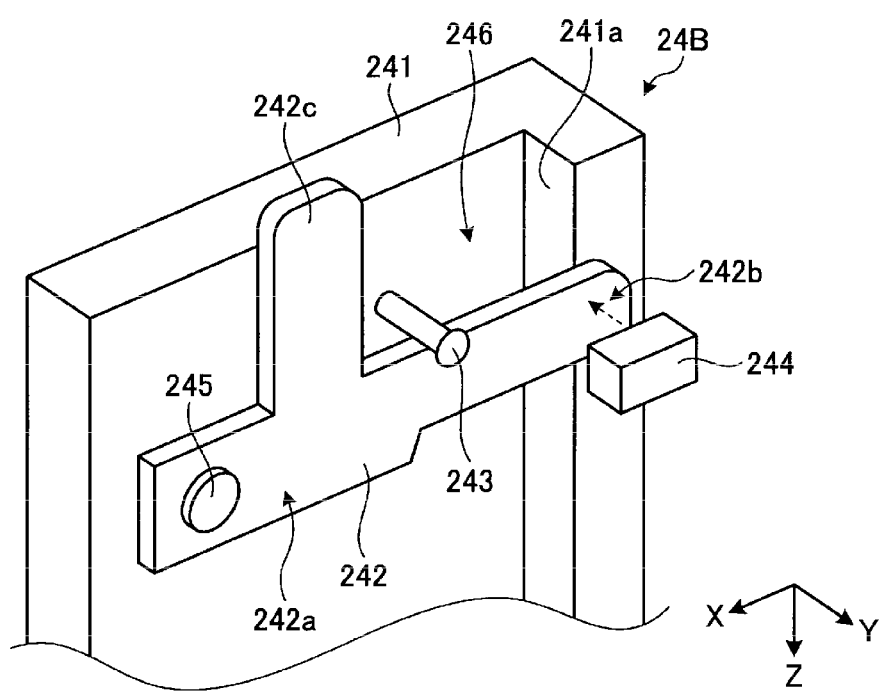
FIG. 10 is a diagram illustrating a configuration of a part of a printer according to a modified example.
Figure 11:
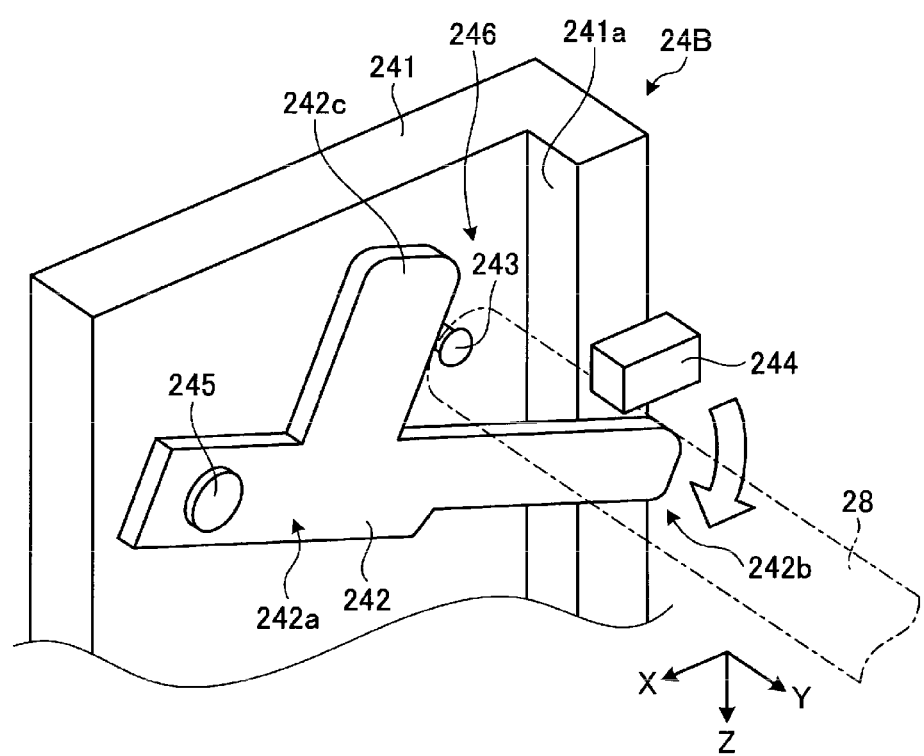
FIG. 11 is a diagram illustrating a configuration of a part of a printer according to a modified example.

Further, with respect to the configuration of the printer 100 according to the first embodiment, a detector configured to detect that the support members 26 are arranged at the supporting position P2 may be provided. FIGS. 10 and 11 are perspective diagrams illustrating an example of a supporting-side retaining portion 24B according to a modified example. The supporting-side retaining portion 24B illustrated in FIGS. 10 and 11 includes a wall 241, a pivot member 242, a support pin 243, and a detector 244. The pivot member 242 includes a base 242a, a first branch 242b, and a second branch 242c. The pivot member 242 is attached to the wall 241 at its base 242a using a shaft 245. The pivot member 242 is provided pivotably in a direction of shaft rotation about a center axis of the shaft 245. The pivot member 242 is connected with an elastic member that is not illustrated. Elastic force provided from this elastic member acts on the pivot member 242 in a counter-clockwise direction in the drawing about the shaft 245. This elastic force from the elastic member maintains the pivot member 242 in a state where the first branch 242b is pressing the support pin 243 upward. It should be noted that the elastic force from the elastic member is set smaller than gravitational force of the coupling member 28, as will be described later.

The detector 244 is for example an optical sensor such as a laser sensor, which irradiates a tip portion of the first branch 242b with laser beam to detect reflected light from the tip portion of the first branch 242b. It should be noted that the detector 244 is not limited to an optical sensor, and other sensors such as a mechanical sensor may be used. A detection result from the detector 244 may be set to be sent for example to the control unit 70.

When the end of the coupling member 28 is to be supported by the supporting-side retaining portion 24B, the end of the coupling member 28 is inserted downward along the Z direction to an insertion 246 between the support pin 243 and a protrusion 241a of the wall 241.

FIG. 11 is a diagram illustrating an example of the supporting-side retaining portion 24B in the state of retaining the end of the coupling member 28. As illustrated in FIG. 11, when the end of the coupling member 28 is retained, it is placed on the first branch 242b of the pivot member 242. A weight of the coupling member 28 is applied downward in the Z direction on the first branch 242b. The elastic force of the elastic member is being applied upward in the Z direction on the first branch 242b: however, since this elastic force is set smaller than the gravitational force of the coupling member 28, the first branch 242b moves downward by the gravitational force of the coupling member 28. Due to this, the pivot member 242 pivots clockwise in the drawing about the axial direction of the center axis of the shaft 245. This pivoting brings the second branch 242c of the pivot member 242 into contact with the support pin 243.

Pivoting of the pivot member 242 is restricted by the second branch 242c being in contact with the support pin 243, and the coupling member 28 comes to be in the state of being supported by the pivot member 242 and the support pin 243. At this occasion, the tip portion of the first branch 242b moves to a position which is not irradiated with the laser beam from the detector 244. Due to this, the detector 244 comes to be in a state of not being able to receive the reflected light from the first branch 242b.

Further, when the coupling member 28 is to be detached, the gravitational force of the coupling member 28 is no longer applied to the first branch 242b of the pivot member 242. Due to this, the pivot member 242 returns to its original position by the elastic force of the elastic member, that is, it returns to the state where the first branch 242b is pressing the support pin 243 upward. At this occasion, the tip portion of the first branch 242b is arranged at the position which is irradiated with the laser beam from the detector 244. Due to this, the detector 244 comes to be in the state of being able to receive the reflected light from the first branch 242b.

As above, the state in which the reflected light can be received is detected by the detector 244 when the coupling member 28 is not retained by the supporting-side retaining portion 24B. Further, the state in which the reflected light cannot be received is detected by the detector 244 when the coupling member 28 is retained by the supporting-side retaining portion 24B. Accordingly, in the control unit 70, when the state in which the reflected light cannot be received is detected by the detector 244, a determination can be made that the coupling member 28 is being retained by the supporting-side retaining portion 24B and the support members 26 are arranged at the supporting position P2.

When the state in which the reflected light cannot be received is detected by the detector 244, the control unit 70 may halt the ink ejecting operation, for example. Due to this, the ink ejecting operation will be halted even if the worker has inputted to restart the ink ejecting operation while the support members 26 are still arranged at the supporting position P2. Due to this, the ink can be inhibited from adhering to the support members 26.

After this, when the state is switched to the state where the reflected light can be received, that is, when the state in which the support members 26 are arranged at the supporting position P2 is no longer detected by the detector 244, the control unit 70 restarts the ink ejecting operation. Due to this, since the ink ejecting operation is restarted without the need for the worker to redo the input for restarting the ink ejecting operation, the burden on the worker can be reduced. It should be noted that, when the state in which the support members 26 are arranged at the supporting position P2 is no longer detected, the control unit 70 may not immediately restart the ink ejecting operation, and the ink ejecting operation may be restarted after a certain time period has elapsed, for example. Due to this, the ink ejecting operation can be inhibited from being executed while the worker is moving the position of the support members 26.

Figure 12:
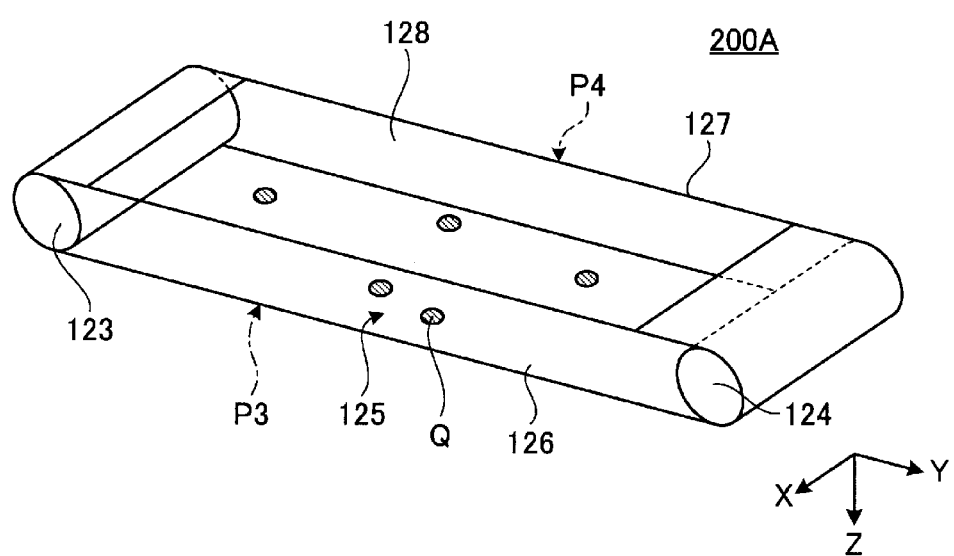
FIG. 12 is a diagram illustrating the configuration of the part of the printer according to the modified example.
Figure 13:
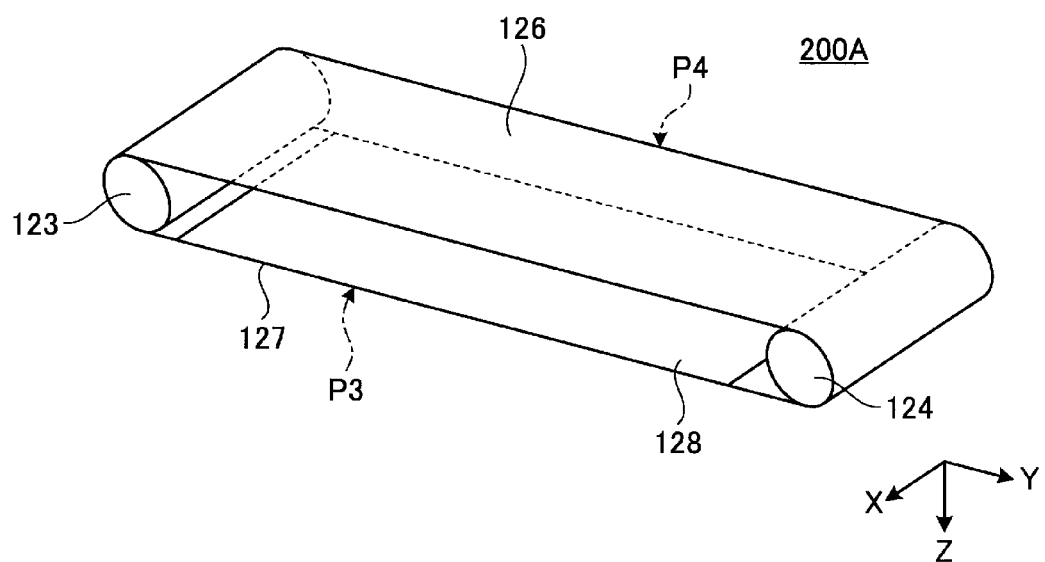
FIG. 13 is a diagram illustrating a configuration of a part of a printer according to a modified example.

Further, in the printer 200 according to the second embodiment, the configuration in which the ink receiver 25 is provided has been exemplified; however, no limitation is made hereto. FIGS. 12 and 13 are perspective diagrams illustrating a part of a configuration of a printer 200A according to a modified example. As illustrated in FIGS. 12 and 13, the printer 200A has a configuration in which the ink receiver 25 is omitted from the printer 200 according to the second embodiment. Other configurations of the printer 200A can be same as the respective configurations of the printer 200 described in the second embodiment.

In the printer 200A, as illustrated in FIG. 12, when the support member 126 is to be arranged at the retracted position P3, the opening 128 is arranged on the upper side along the Z direction, and an inner surface of the support member 126 comes to be in a state of being exposed in the opening 128. In this state, the printer 200A is configured to receive the ink Q that has fallen through the medium when the printing operation is performed by the inner surface of the support member 126. That is, the printer 200A uses the inner surface of the support member 126 as an ink receiver 125.

On the other hand, when the support member 126 is arranged at the supporting position P4, for example as illustrated in FIG. 13, the support member 126 is arranged on the upper side along the Z direction, and the opening 128 is arranged on the lower side along the Z direction. In this case, the ink receiver 125 (inner surface of the support member 126) faces downward in the Z direction. Accordingly, even if the medium is supported on an outer surface of the support member 126, the ink can be inhibited from adhering to the medium. It should be noted that the printer 200A may separately include a configuration that can wipe off the ink on the inner surface of the support member 126.

Figure 14:
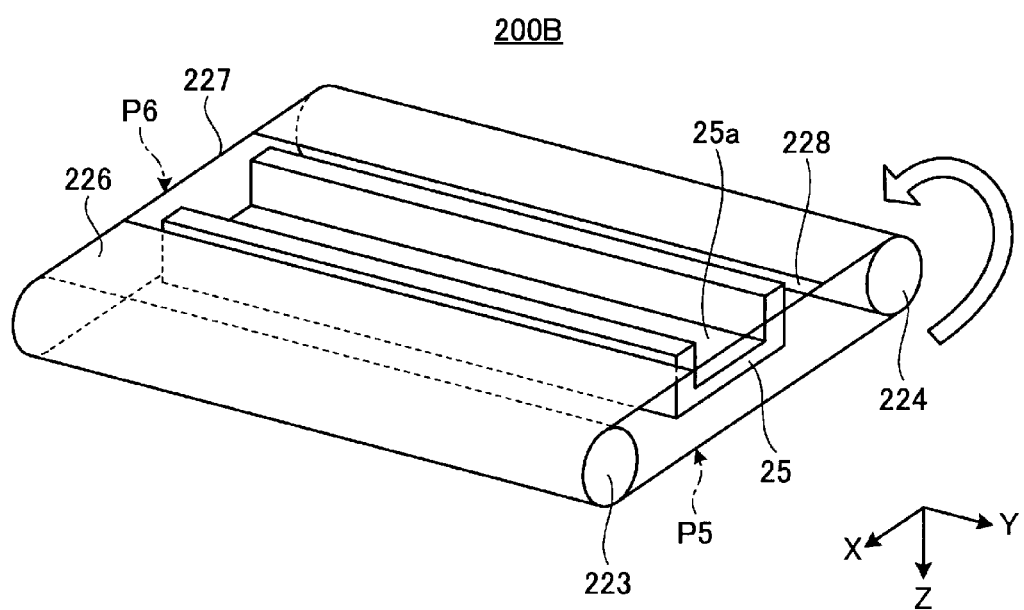
FIG. 14 is a diagram illustrating the configuration of the part of the printer according to the modified example.

Further, in the printer 200 according to the second embodiment, the configuration in which the support member 126 is moved along the Y direction has been exemplified; however, no limitation is made hereto. FIG. 14 is a perspective diagram illustrating a part of a configuration of a printer 200B according to a modified example. The printer 200B is configured to move a support member 226 along the X direction. It should be noted that other configurations of the printer 200B can be same as the respective configurations of the printer 100 described in the first embodiment.

As illustrated in FIG. 14, the support member 226 is formed for example in a rectangular shape, and is formed with a dimension with which at least the upper portion of the ink receiver 25 in the Z direction can be covered. The support member 226 is arranged so that its longitudinal direction is parallel to the X direction. The support member 226 is formed in a loop by two wire members 227.

The wire members 227 couple corners at both ends of the support member 226 in the longitudinal direction. The two wire members 227 are formed with a length that is the same as each other. A portion surrounded by both end edges of the support member 226 in the longitudinal direction and the two wire members 227 is formed as an opening 228. The two wire members 227 are formed with a dimension by which the opening 228 can expose the entirety of the ink receiver 25. For example, the two wire members 227 have a dimension in the X direction larger than the dimension of the ink receiver 25 in the X direction.

The support member 226 is strapped across a driving roller 223 and a driven roller 224, for example. The driving roller 223 and the driven roller 224 are provided at both sides of the ink receiver 25 in the X direction, and are arranged parallel to the Y direction. The driving roller 223 and the driven roller 224 are rotatable about axial lines of their rotary axes parallel to the Y direction. An operation of the driving roller 223 is controlled for example by the control unit 70. By actuating the driving roller 223, the support member 226 is enabled to move primarily in the X direction between a retracted position P5 and a supporting position P6.

When the support member 226 is arranged at the retracted position P5, for example as illustrated in FIG. 14, the opening 228 is arranged above the ink receiver 25 in the Z direction, and the support member 226 is arranged below the ink receiver 25 in the Z direction. In this case, the ink receiver 25 is in a state of not being covered by the support member 226. When the support member 226 is arranged at the supporting position P6, the support member 226 is arranged above the ink receiver 25 in the Z direction, and the opening 228 is arranged below the ink receiver 25 in the Z direction. In this case, the ink receiver 25 is in a state of being covered by the support member 226. As above, by configuring the support member 226 to be movable along the X direction, spaces on both sides of the ink receiver 25 in the X direction can be efficiently used.

What is claimed is:

1. A printer, comprising:
a medium transporter, configured to feed out a medium in rolled shape and transport the medium in a first direction;
a head, provided movably in a second direction intersecting the first direction and configured to eject droplets for image-forming downward along a vertical direction toward the medium which is transported;
a receiver, provided below a region of the medium facing the head along the vertical direction, and configured to receive the droplets which are ejected onto the medium from the head and pass through the medium downward along the vertical direction; and
a support member, configured switchably arranged at a supporting position arranged between the medium and the receiver along the vertical direction and a retracted position that is retracted from the supporting position, and configured capable of supporting the medium in a state of being arranged at the supporting position.

2. The printer according to claim 1, wherein
the receiver includes a recess at a portion facing the medium, and
the supporting position is a position above the recess along the vertical direction, and is a position where the support member covers an entirety of the recess in the first direction.

3. The printer according to claim 1, wherein
the support member is formed by using at least one of a flexible sheet material and a flexible linear material.

4. The printer according to claim 1, wherein
the support member is movable along the first direction between the supporting position and the retracted position.

5. The printer according to claim 4, wherein
the support member is arranged in plurality with an interval in between along the second direction, and
the plurality of support members are integrally movable between the supporting position and the retracted position.

6. The printer according to claim 1, wherein
the support member is movable along the second direction between the supporting position and the retracted position.

7. The printer according to claim 1, further comprising:
a detector, capable of detecting a state in which the support member is arranged at the supporting position.

8. The printer according to claim 7, further comprising:
a controller, configured to cause the head to halt an ejecting operation of the droplets when the state in which the support member is arranged at the supporting position is detected by the detector.

9. The printer according to claim 8, wherein
the controller restarts the ejecting operation when the state in which the support member is arranged at the supporting position is no longer detected by the detector.

10. The printer according to claim 2, wherein
the support member is formed by using at least one of a flexible sheet material and a flexible linear material.

11. The printer according to claim 2, wherein
the support member is movable along the first direction between the supporting position and the retracted position.

12. The printer according to claim 3, wherein
the support member is movable along the first direction between the supporting position and the retracted position.

13. The printer according to claim 10, wherein
the support member is movable along the first direction between the supporting position and the retracted position.

14. The printer according to claim 11, wherein
the support member is arranged in plurality with an interval in between along the second direction, and
the plurality of support members are integrally movable between the supporting position and the retracted position.

15. The printer according to claim 12, wherein
the support member is arranged in plurality with an interval in between along the second direction, and
the plurality of support members are integrally movable between the supporting position and the retracted position.

16. The printer according to claim 13, wherein
the support member is arranged in plurality with an interval in between along the second direction, and
the plurality of support members are integrally movable between the supporting position and the retracted position.

17. The printer according to claim 2, wherein
the support member is movable along the second direction between the supporting position and the retracted position.

18. The printer according to claim 3, wherein
the support member is movable along the second direction between the supporting position and the retracted position.

19. The printer according to claim 10, wherein
the support member is movable along the second direction between the supporting position and the retracted position.

20. The printer according to claim 2, further comprising:
a detector, capable of detecting a state in which the support member is arranged at the supporting position.

* * * * *